Nov. 7, 1933.                C. A. FRICK                1,934,623
LIQUID MEASURING AND DISPENSING APPARATUS
Filed Dec. 18, 1930
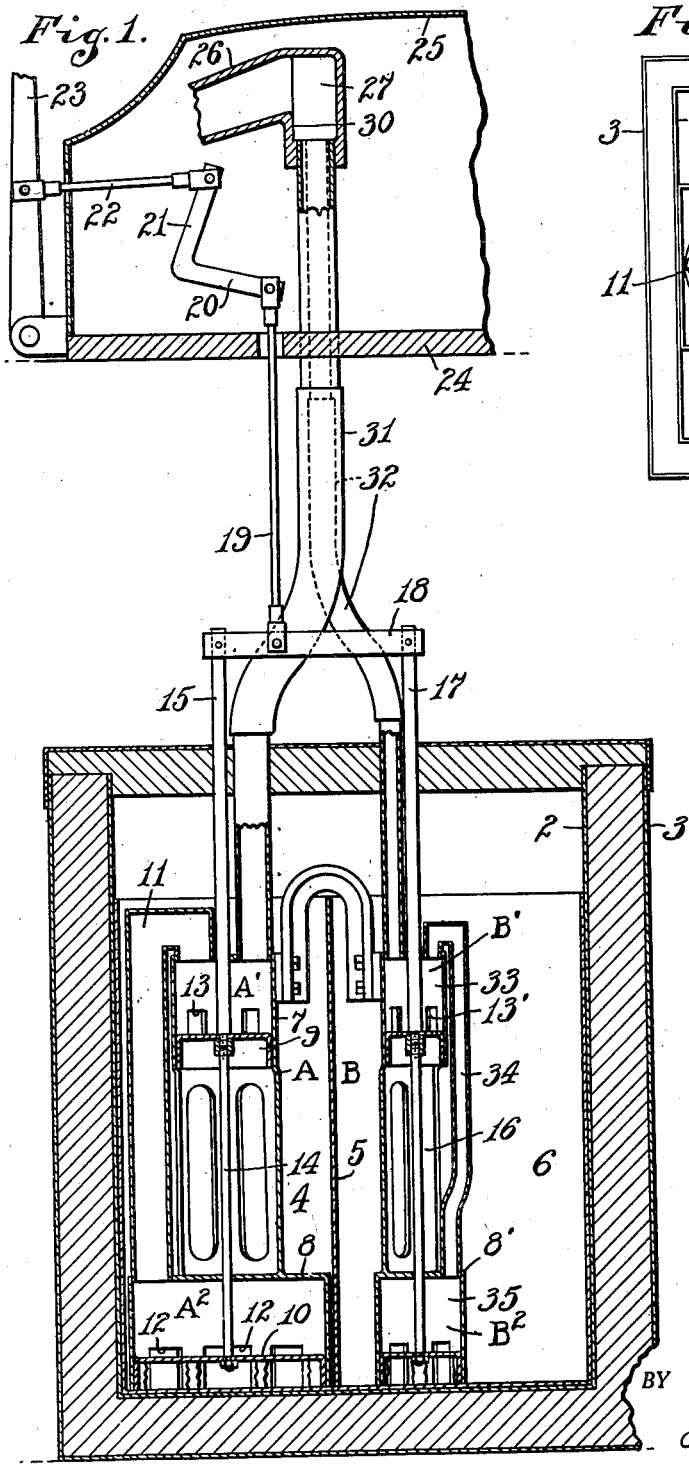
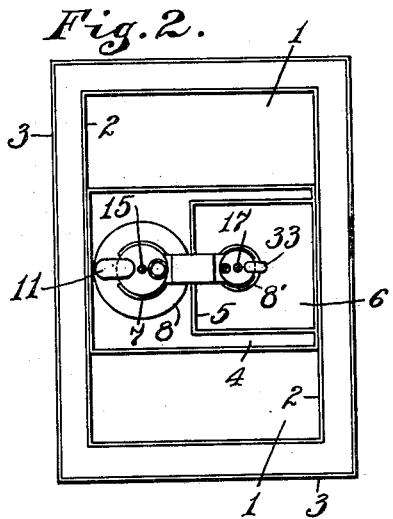
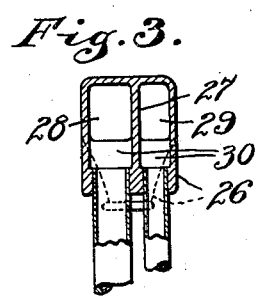
INVENTOR.
Chester A. Frick,
BY
Hood & Hahn.
ATTORNEYS Patented Nov. 7, 1933

1,934,623

UNITED STATES PATENT OFFICE 1,934,623

LIQUID MEASURING AND DISPENSING APPARATUS

Chester A. Frick, Muncie, Ind., assignor to Glascock Brothers Manufacturing Company, Muncie, Ind., a corporation of Indiana Application December 18, 1930
Serial No. 503,154

8 Claims. (Cl. 225—21)

My invention relates to improvements in drink dispensing apparatus and particularly to that type of drink dispensing apparatus wherein a concentrated flavor or fruit juice is adapted to be mixed with another liquid as, for instance, a carbonated liquid or water.

In certain dispensing apparatus for beverages, the concentrated fruit juice is mixed in certain proportions with water before dispensing. Under the present type of commercial dispensing apparatus this mixing takes place in a common receptacle in which a predetermined quantity of water and a predetermined quantity of fruit juice is disposed. By the arrangement as provided in the dispensing apparatus of my invention, a constant supply of water may be maintained and it is, therefore, only necessary to renew the concentrate.

Other advantages and novel features will appear more fully in the accompanying specification and claims.

For the purpose of disclosing my invention I have illustrated one embodiment thereof in the accompanying drawing, in which:

Fig. 1 is a longitudinal sectional view of the dispenser embodying my invention;

Fig. 2 is a plan view of the dispenser container, the cover having been removed, and Fig. 3 is a detailed section of the dispensing nozzle.

In the embodiment illustrated, I provide a suitable refrigerating container 1 consisting of inner and outer walls 2 and 3, between which heat insulating material may be arranged. The compartment or container 1 provides a refrigerant container in which ice and water may be maintained for cooling the dispensed beverage. Within the container 1 I arrange a water compartment 4, open at its top and this compartment is divided by the walls 5 into a concentrate compartment 6. Any suitable means may be provided for maintaining the water compartment filled as for instance, the compartment may be connected with a water supply controlled by a suitable float valve in the compartment. The concentrate compartment is adapted to be filled from time to time dependent upon the level of the concentrate in the compartment.

Certain beverages now being commercially dispensed have the concentrate mixed with the water in the proportions of about five parts water and one part concentrate and the machine illustrated is designed for this proportion. However, it will be understood that any proportion desired may be provided for.

Within the water compartment 4 I arrange a liquid pump comprising an outer casing, the upper end 7 of which is smaller in diameter than the lower end 8. A piston 9 operates in this upper end 7 and a similar piston 10 operates in the lower portion. The lower section or portion of the cylinder above the piston 10 is connected by a suitable conduit 11 with the upper portion 7, the conduit extending from the top of the portion 8 and delivering into the top of the portion 7. The liquid is supplied above the piston 10 through suitable ports or openings 12 in the bottom of the casing portion 8 and the casing portion 7 communicates through the ports 13 with the compartment 4. These ports are above the piston 9 when it is in its lower position but, when the piston 9 is raised to the limit of its upward stroke the upper edge of these ports is beneath the piston. The two pistons 9 and 10 are connected together by a connecting rod 14 and are connected to an operating rod 15.

A second pump 16 of the same construction as heretofore described is arranged in the compartment 6. Due to the fact, however, that the proportion or measure of the concentrate with the water is to be about five parts water and one part concentrate, the capacity of the pump in the water compartment 4 is five times greater than the capacity of the pump 16. An operating rod 17 is provided for the pump 16 and the two rods 15 and 17 are connected by a yoke 18 in turn connected with a lift rod 19 connected to one arm 20 of a bell crank lever. The opposite arm 21 of this bell crank lever is connected by a connecting rod 22 with an operating handle or lever 23. The operating mechanism may be mounted on the counter or to the support 24 arranged above the dispensing apparatus and is preferably enclosed by a suitable enclosing casing 25.

A dispensing nozzle 26 is mounted within the casing 25 and the intake end of this nozzle is divided by a web 27 into the compartments 28 and 29, these compartments, however, delivering into the nozzle portion which is common to both, over a web 30.

The compartment 28 is connected by a suitable conduit 31 with the top of the portion 7 of the pump casing and the compartment 29 is connected by a suitable conduit 32 with the top of the pump 16, it being noted that this top portion 33 of the 16, it being noted that this top portion 33 of the pump 16 is connected by the conduit 34 with the lower portion 35 of the pump 16.

The maximum water level in both of the compartments 4 and 6 is just below the top of the openings 13 and 13' in the two pumps, it being noted that these openings are in the same level and that their tops are in the same plane and the minimum liquid level should be not lower than the top of the lower sections 8 and 8'.

The construction of the apparatus is such that all liquid raised by both pumps, which is not delivered from the nozzle 26 will, when the pumps are moved to their retracted positions, flow back into the respective compartments leaving the conduits 31 and 32 and the compartments, 28 and 29 empty. The pumps are adapted to deliver through the nozzle 26 a measured quantity on each full stroke thereof. This quantity may be sufficient to fill a glass or any other container.

In order to understand more fully the operation of the apparatus the pump in the compartment 4 may be referred to as the pump A and may be considered as consisting of the two pumps A' and A2. The pump 16 may be described as the pump B and considered as consisting of the two pumps B' and B2. The capacity of the pump A2 is equal to the capacity of the pump A' plus the capacity of the conduit 11 and the capacity of the pump A' is equal to the capacity of the conduit 31, to the top of the web 30 plus the predetermined quantity to be mixed. The relative capacity of the pumps B' and B2 is the same with the exception that the total capacity of the pump B is one-fifth of the capacity of the pump A and the combined capacities of the pumps A and B will deliver the total quantity of the two liquids desired. In operation, due to the opening of the ports 12, with the piston 10 in its lowermost position and the opening of the ports 13 with the piston 9 in its lowermost position, the liquid will flow above the piston 10 and rise to its level in the tube 11. If the level is sufficiently high, the liquid will also flow above the piston 9 through the ports 13. Upon the raising of the piston 10, as soon as it has passed the top of the ports 12 the liquid will be elevated through the tube or conduit 11 into the pump A' above the piston 9. However, until the piston 9 moves to the top of the ports 13, this liquid will escape through these ports. When, however, the piston 9 passes the top of the ports 13, the remaining liquid delivered therein will be forced up through the conduit 31 and out through the nozzle 26. This same action takes place in the pump B so that, a supply from each of the compartments 4 and 6 will be delivered to the nozzle 26 and as it passes out of the respective compartments 28 and 29 in this nozzle the two liquids will mix and be delivered as one to the receiver. When the operating handle 23 is reversed to retract the pistons of the two pumps, the liquids up to the top of the web 30 will flow back through the conduits 31 and 32 into the respective compartments. It will be noted that during the delivery of the pumps none of the liquid can flow back through the conduits 11 and 34 as these conduits are filled and the liquid is prevented from flowing past the piston in the pump A2 and B2.

I claim the following:

1. In a dispensing apparatus, a pump for elevating a predetermined quantity of liquid from a liquid containing compartment, and comprising a bottom piston pump having an intake port above the lowermost stroke of its piston, and adapted to be closed by said piston, an upper piston pump having a drainage port above the lowermost stroke of its piston and adapted to be closed by said piston, and a conduit connecting said bottom pump with the upper pump.

2. In a liquid dispensing apparatus, a piston pump for elevating a predetermined quantity of liquid and having escape ports above the lowermost position of the piston, a pump arranged below said first mentioned pump having intake ports above the lowermost position of its piston, both of said ports being adapted to be closed by the raising of the piston, and a conduit connecting the top of said lower pump with the top of the other pump, the capacity of said lower pump being equal to the capacity of the upper pump plus the capacity of the conduit.

3. In a liquid dispensing apparatus, the combination with two separate liquid containing compartments, of a measuring pump for each of the liquid compartments constructed to deliver a measured quantity of liquid, a delivery nozzle arranged above said pumps and having separated compartments, one connected to one of said pumps and the other connected to the other of said pumps, said pumps having drainage parts therein to drain all the liquid in the conduits and respective compartments of the nozzle back into the respective liquid compartments when the pumps are in normal position.

4. A liquid dispensing and measuring apparatus comprising a liquid-containing compartment, a measuring pump arranged in said compartment above the liquid level and having drainage openings therein for draining the liquid therefrom back to the compartment to leave the pump normally empty, and a second pump in said compartment immersed in the liquid for delivering liquid to the first pump.

5. A liquid dispensing and measuring apparatus comprising a pump constructed to deliver a measured quantity per stroke of its piston and having drainage openings normally open when its piston is in its retracted position, and a second pump having a measured delivery capacity for supplying said first-mentioned pump with liquid.

6. A liquid dispensing and measuring apparatus comprising a liquid container, a liquid pump mounted above the maximum liquid level in said container and having means for emptying itself when the pump is inactive, and a second pump arranged below the minimum liquid level in said compartment and having a delivery connection with said first pump, and cooperating with said first pump to deliver a measured quantity of liquid upon each piston stroke irrespective of the liquid level in the compartment between the maximum and the minimum.

7. A liquid dispensing and measuring apparatus comprising a liquid compartment, a liquid pump arranged above the liquid level of said compartment having drainage openings therein for draining the liquid therefrom back to the compartment to leave the pump normally empty and means for positively delivering liquid from the compartment to the pump, said pump being constructed to deliver a measured quantity per stroke irrespective of the quantity of liquid in the container.

8. An apparatus for dispensing liquid comprising a liquid container, a pump mounted above the liquid level of the container having drainage ports therein to permit the pump to empty itself operating with said first pump to deliver a measured quantity per stroke, means for delivering the liquid in the compartment to the pump and means for draining from the pump any liquid delivered thereto in excess of the amount to be delivered by the pump.

CHESTER A. FRICK.

CERTIFICATE OF CORRECTION.

Patent No. 1,934,623.  November 7, 1933.

CHESTER A. FRICK.

It is hereby certified that error appears in the printed specification of the above numbered patent requiring correction as follows: Page 2, line 144, claim 8, strike out the words "operating with said first pump" and insert instead when quiescent and constructed; and that the said Letters Patent should be read with this correction therein that the same may conform to the record of the case in the Patent Office.

Signed and sealed this 28th day of November, A. D. 1933.

F. M. Hopkins (Seal)  Acting Commissioner of Patents.